(12) United States Patent
Lee et al.

(10) Patent No.: US 7,781,151 B2
(45) Date of Patent: Aug. 24, 2010

(54) MANUFACTURING METHOD OF FUEL CELL HAVING MICRO SENSORS AND POLYMER LAYERS

(75) Inventors: Chi-Yuan Lee, Jhonghe (TW); Shuo-Jen Lee, Yonghe (TW); Guan-Wei Wu, Su-ao Township, Yilan County (TW)

(73) Assignee: Yuan Ze University, Taoyuan County (TW)

( * ) Notice: Subject to any disclaimer, the term of this patent is extended or adjusted under 35 U.S.C. 154(b) by 455 days.

(21) Appl. No.: 11/826,209

(22) Filed: Jul. 13, 2007

(65) Prior Publication Data

US 2008/0044771 A1 Feb. 21, 2008

(30) Foreign Application Priority Data

Aug. 15, 2006 (TW) ............................... 95129985 A

(51) Int. Cl.
*G03C 5/00* (2006.01)
*G03F 7/00* (2006.01)
(52) U.S. Cl. .................. 430/311; 430/394; 430/319

(58) Field of Classification Search ................. 430/311, 430/312, 394, 319; 429/210
See application file for complete search history.

(56) References Cited

U.S. PATENT DOCUMENTS 3,922,774 A * 12/1975 Lindmayer et al. ............ 438/72
2007/0212863 A1 * 9/2007 Brunner et al. ............. 438/585

* cited by examiner

*Primary Examiner*—Kathleen Duda
*Assistant Examiner*—Caleen O Sullivan
(74) *Attorney, Agent, or Firm*—Rosenberg, Klein & Lee

(57) ABSTRACT

A manufacturing method of fuel cell having micro sensors and polymer layers is disclosed. It include the following steps of: (1) depositing first polymer layer step, (2) first lithographic processing step, (3) depositing chromium layer step, (4) depositing gold layer step, (5) removing first photo-resist layer step, (6) depositing second polymer layer step, (7) second lithographic processing step, (8) plasma etching step, (9) removing second photo-resist layer step, and (10) complete step. About this invention, the polymer layers can protect the micro sensors. The micro sensors can be installed at a specific location in the flow channel. The entire manufacturing cost is lowered.

6 Claims, 3 Drawing Sheets

MANUFACTURING METHOD OF FUEL CELL HAVING MICRO SENSORS AND POLYMER LAYERS

BACKGROUND OF INVENTION

1. Field of the Invention

The present invention relates to a manufacturing method of fuel cell having micro sensors and polymer layers. About this invention, the polymer layers can protect the micro sensors. The micro sensors can be installed at a specific location in the flow channel. The entire manufacturing cost is lowered.

2. Description of the Prior Art

Concerning the traditional fuel cell, the micro sensors are usually disposed at the entrance and the exit of the flow channel of the fuel cell. Therefore, it is quite difficult to detect the real condition at a specific point in this flow channel, especially to obtain the data of exact temperature distribution, humidity distribution, etc.

Although it seems possible to install some micro sensors on the wall of the flow channel inside the fuel cell, it will encounter many technical problems and barriers as follows.

[1] The installed micro sensors are easy to be rusted or interfered by water droplets or damp gas. For example, a Hydrogen-Oxygen fuel cell will create water (or water droplets) after electrochemical reaction inside the fuel cell. Such water will make the micro sensors rusted, corroded or short-circuited.

[2] The manufacturing process to integrate micro sensors in the fuel cell is very complicated. Assuming that the length of the flow channel is 20 cm and is curvy (like a snake), it is required to install five micro sensors at the five specific locations, namely at 0, 5, 10, 15, and 20 cm (starting from the entrance). However, the entire manufacturing process is quite difficult. In addition, in order to obtain the signals of these five micro sensors, it is also required to install ten lines to connect with these micro sensors. Thus, it makes the manufacturing process more difficult. Besides, if one of the installed micro sensors is out of order, it is hard to fix it or to replace a new one. The entire fuel cell only can be abandoned.

[3] The manufacturing process costs higher. It might be possible to install micro sensors inside the fuel cell. However, the manufacturing process costs higher. Hence, its commercial competition ability decreases.

SUMMARY OF THE INVENTION

The primary object of the present invention is to provide a manufacturing method of fuel cell having micro sensors and polymer layers. In which, the polymer layers can protect the micro sensors.

The next object of the present invention is to provide a manufacturing method of fuel cell having micro sensors and polymer layers. The micro sensors can be installed at a specific location in the flow channel.

Another object of the present invention is to provide a manufacturing method of fuel cell having micro sensors and polymer layers. The entire manufacturing cost is lowered.

In order to achieve above-mentioned objects, the present invention is provided. This invention is a manufacturing method of fuel cell having micro sensors and polymer layers, comprising the following steps:

[1] depositing first polymer layer step;
[2] first lithographic processing step;
[3] depositing chromium layer step;
[4] depositing gold layer step;
[5] removing first photo-resist layer step;
[6] depositing second polymer layer step;
[7] second lithographic processing step;
[8] plasma etching step;
[9] removing second photo-resist layer step; and
[10] complete step.

DETAILED DESCRIPTION OF THE PREFERRED EMBODIMENT

Figure 1:
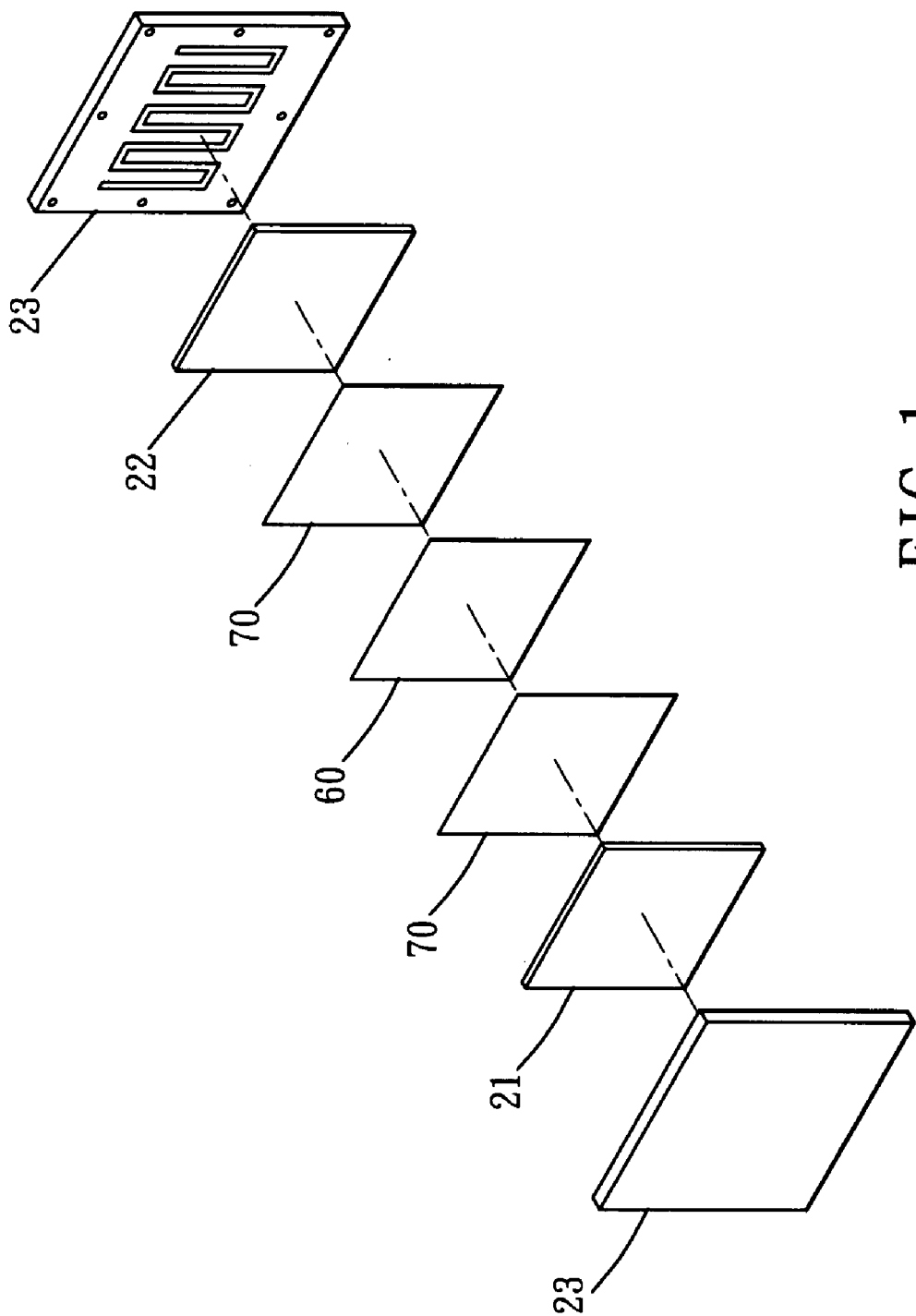
FIG. 1 is an exploded view of the present invention.
Figure 2:
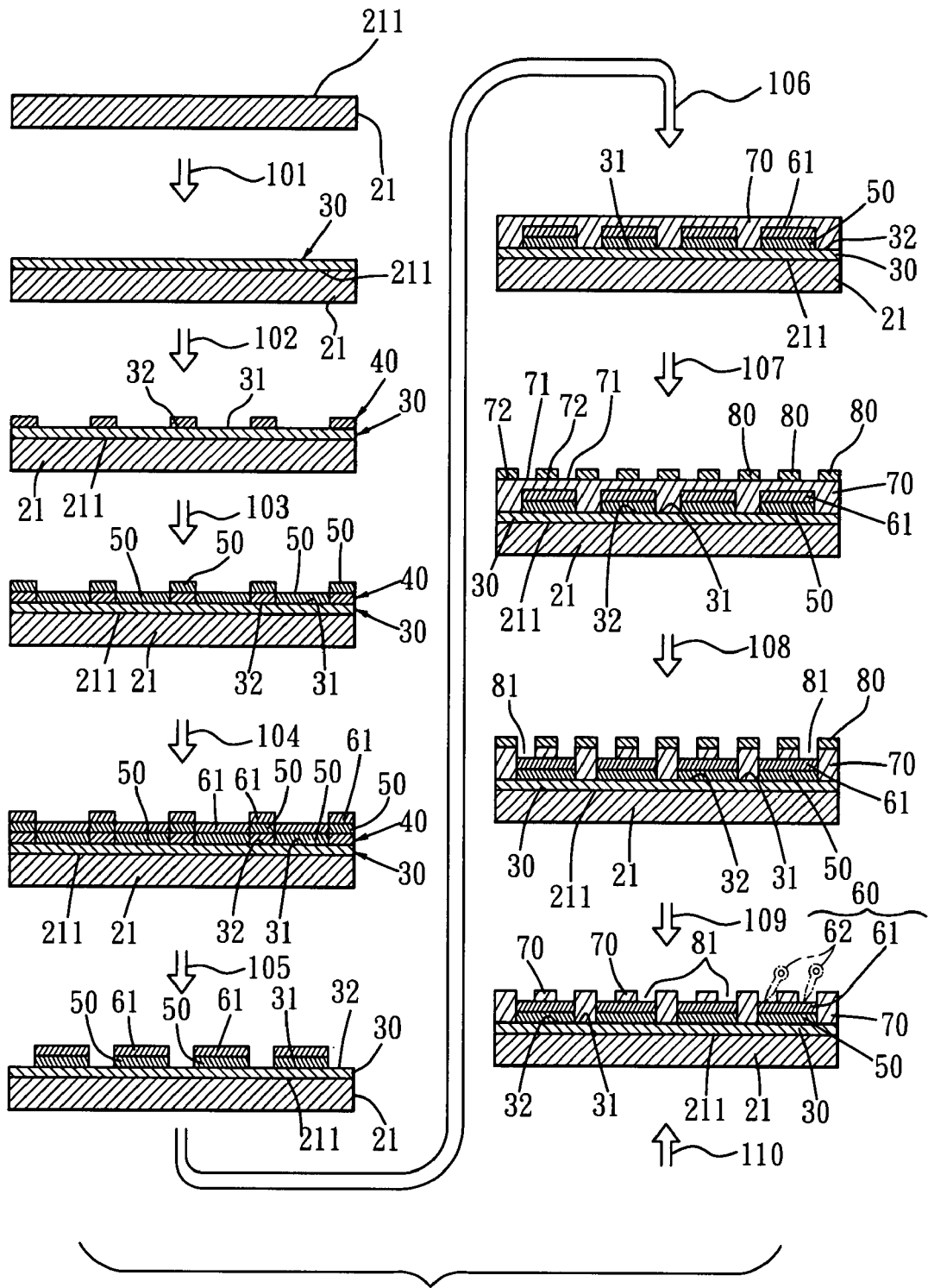
FIG. 2 shows the flow chart with illustrations about the manufacturing method of the present invention.
Figure 3:
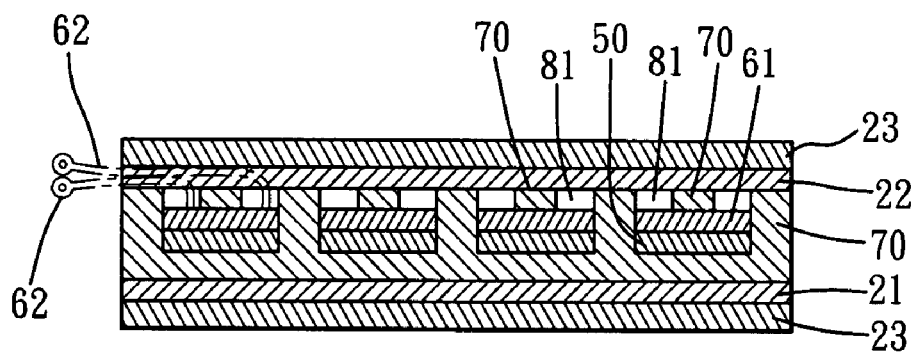
FIG. 3 is a cross-sectional view showing the semi-product of the present invention.

Referring to FIGS. 1 to 3, the present invention is a manufacturing method of fuel cell having micro sensors and polymer layers. It comprises the following step:

[1] depositing first polymer layer step 101: preparing a first film-electrode 21 made by a silicon-based material, the first film-electrode 21 having a working surface 211, depositing a first polymer layer 30 on this working surface 211;

[2] first lithographic processing step 102: coating a first photo-resist layer 40 on the first polymer layer 30 by utilizing lithographic processing technology, the first photo-resist layer 40 having a first pattern, so the first polymer layer 30 including a first exposed portion 31 and a first blocking portion 32;

[3] depositing chromium layer step 103: depositing a chromium layer 50 on the first photo-resist layer 40 and the first exposed portion 31 of the first polymer layer 30 to a predetermined thickness;

[4] depositing gold layer step 104: depositing a gold layer 61 on the chromium layer 50;

[5] removing first photo-resist layer step 105: removing the first photo-resist layer 40 on the first blocking layer 32 of the first polymer layer 30, the chromium layer 50 on the first photo-resist layer 40, and the gold layer 61 on the chromium layer 50;

[6] depositing a second polymer layer step 106: depositing a second polymer layer 70 on the first blocking layer 32 of the first polymer layer 30 and the gold layer 61 on the chromium layer 50;

[7] second lithographic processing step 107: coating a second photo-resist layer 80 on the second polymer layer 70 by utilizing lithographic processing technology, the second photo-resist layer 80 having a second pattern, so the second polymer layer 70 including a second exposed portion 71 and a second blocking portion 72;

[8] plasma etching step 108: by using a Reacting-Ion-Etching (RIH) machine (not shown), conducting a plasma etching on the second exposed portion 71 of the second polymer 70 for etching downward, and forming a plurality of metal connecting portions 81 that connect with the gold layer 80;

[9] removing second photo-resist layer step 109: removing the second photo-resist layer 80;

[10] complete step 110: disposing lead lines 62 to connect with the metal connecting portions 81, assembling a second film-electrode 22, and assembling a pair of bipolar plates 23, in which the first film-electrode 21 and the second film-electrode 22 are sandwiched by the bipolar plates 23, so that a fuel cell having micro sensors and polymer layers is formed.

With regard to the procedure for installing micro sensors 60 in the second film-electrode 22, it is substantially the same as the one for installing micro sensors 60 in the first film-electrode 22. Therefore, the description for this procedure is omitted. The final product of the second film-electrode 22 can be seen in FIG. 1

In addition, the total volume of these micro sensors 60 is very small (even look like small black dots), so it is negligible when someone compares it with the total volume of the bipolar plates 23. Thus, all these micro sensors 60 are not shown in FIG. 1.

Practically, in the depositing first polymer layer step 101, the first polymer layer 30 is poly-para-xylylene (briefly called parylene).

In the first lithographic processing step 102, the first photo-resist layer 40 is the AZ-4602 type.

In the depositing gold layer step 104, the gold layer 60 on the chromium layer 50 works as a sensor.

In the depositing a second polymer layer step 106, the second polymer layer 70 is poly-para-xylylene (briefly called parylene).

In the second lithographic processing step 107, the second photo-resist layer 80 is the AZ-4602 type.

About the plasma etching step 108, the Reacting-Ion-Etching (RIH) machine uses plasma (that containing oxygen) to etch the second exposed portion 71 of the second polymer 70.

In the removing second photo-resist layer step 109, the second photo-resist layer 80 is removed by using acetone.

Therefore, the advantages and functions of this invention can be summarized as follows:

[1] The polymer layers can protect the micro sensors. In this invention, the polymer layers protect the micro sensors. So, it significantly reduces the possibility to be rusted, corroded, or interfered by water droplets or damp gas. Especially, it can increase the life and accuracy of the micro sensors (contacting the flow channel) installed inside the fuel cell.

[2] The micro sensors can be installed at a specific location in the flow channel. The locations of these micro sensors can be arranged in advance for detecting desired points in the flow channel inside the fuel cell. Hence, the micro sensors can be installed at a specific location. In addition, if one of the micro sensors is out of order, the user can replace a new set of the film-electrodes instead. Its maintenance work becomes extremely easy.

[3] The entire manufacturing cost is lowered. The sheet-like semi-product (or the set of film-electrodes) contains micro sensors. It is very suitable for mass production. After the sheet-like semi-product is assembled with the bipolar plates, the final product is completed. Thus, the entire manufacturing cost is lowered.

The above embodiments are only used to illustrate the present invention; not intended to limit the scope thereof. Many modifications of the above embodiments can be made without departing from the spirit of the present invention.

What is claimed is:

1. A manufacturing method of fuel cell having micro sensors and polymer layers, comprising:

[1] preparing a first film-electrode made by a silicon-based material, said first film-electrode having a working surface, depositing a first polymer layer on said working surface;

[2] coating a first photo-resist layer on said first polymer layer by utilizing lithographic processing technology, said first photo-resist layer having a first pattern to define on said first polymer layer a first exposed portion and a first blocking portion;

[3] depositing a chromium layer on said first photo-resist layer and said first exposed portion of said first polymer layer to a predetermined thickness;

[4] depositing a gold layer on said chromium layer;

[5] removing from said first blocking portion of the first polymer layer said first photo-resist layer, said chromium layer, and said gold layer thereon;

[6] depositing a second polymer layer on said first blocking portion of the first polymer layer layer and said gold layer;

[7] coating a second photo-resist layer on said second polymer layer by utilizing lithographic processing technology, said second photo-resist layer having a second pattern to define on said second polymer layer a second exposed portion and a second blocking portion;

[8] conducting a plasma etching on said second exposed portion of said second polymer for etching downward, and forming a plurality of metal connecting portions connecting with said gold layer;

[9] removing said second photo-resist layer; and

[10] disposing lead lines to connect with said metal connecting portions, assembling a second film-electrode, and assembling a pair of bipolar plates, wherein said first film-electrode and said second film-electrode are sandwiched by said bipolar plates, wherein a fuel cell having micro sensors and polymer layers is formed.

2. The manufacturing method of fuel cell having micro sensors and polymer layers according to claim 1, wherein said first polymer layer is poly-para-xylylene in said depositing first polymer layer step.

3. The manufacturing method of fuel cell having micro sensors and polymer layers according to claim 1, wherein the function of said gold layer on said chromium layer is a sensor.

4. The manufacturing method of fuel cell having micro sensors and polymer layers according to claim 1, wherein said second polymer layer is poly-para-xylylene in said depositing second polymer layer step.

5. The manufacturing method of fuel cell having micro sensors and polymer layers according to claim 1, wherein the Reacting-Ion-Etching (RIH) machine uses plasma that containing oxygen to etch the second exposed portion of said second polymer in the plasma etching step.

6. The manufacturing method of fuel cell having micro sensors and polymer layers according to claim 1, wherein the second photo-resist layer is removed by using acetone in said removing second photo-resist layer step.

* * * * *